US010121375B2

(12) United States Patent
Larcher et al.

(10) Patent No.: US 10,121,375 B2
(45) Date of Patent: Nov. 6, 2018

(54) CONTROLLING A PARKING LOT SENSOR

(71) Applicant: Robert Bosch GmbH, Stuttgart (DE)

(72) Inventors: Nils Larcher, Tuebingen (DE); Martin Werner, Tuebingen (DE); Wolf-Bastian Poettner, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 186 days.

(21) Appl. No.: 15/180,167

(22) Filed: Jun. 13, 2016

(65) Prior Publication Data
US 2016/0370495 A1   Dec. 22, 2016

(30) Foreign Application Priority Data

Jun. 16, 2015   (DE) .................. 10 2015 211 054

(51) Int. Cl.
*G01V 9/00* (2006.01)
*G08G 1/14* (2006.01)
*G08G 1/01* (2006.01)

(52) U.S. Cl.
CPC ............ *G08G 1/146* (2013.01); *G01V 9/00* (2013.01); *G08G 1/0137* (2013.01)

(58) Field of Classification Search
USPC ........................................................ 702/150
See application file for complete search history.

(56) References Cited

U.S. PATENT DOCUMENTS

| 6,107,942 | A | * | 8/2000 | Yoo | ............... | G08G 1/14 340/468 |
|---|---|---|---|---|---|---|
| 6,771,185 | B1 | * | 8/2004 | Yoo | ............... | G06Q 30/0284 340/525 |
| 6,917,307 | B2 | * | 7/2005 | Li | ............... | G08G 1/14 194/902 |
| 2003/0076417 | A1 | * | 4/2003 | Thomas | ............... | G07B 15/02 348/169 |
| 2005/0083212 | A1 | * | 4/2005 | Chew | ............... | G08G 1/14 340/932.2 |
| 2008/0136674 | A1 | * | 6/2008 | Jang | ............... | G08G 1/017 340/932.2 |
| 2008/0266138 | A1 | * | 10/2008 | Ponert | ............... | G08G 1/04 340/932.2 |
| 2012/0044091 | A1 | * | 2/2012 | Kim | ............... | G08G 1/143 340/932.2 |
| 2014/0210646 | A1 | * | 7/2014 | Subramanya | ............... | B61L 29/28 340/928 |
| 2014/0297227 | A1 | * | 10/2014 | Barnard | ............... | G01J 1/42 702/189 |
| 2014/0344026 | A1 | * | 11/2014 | Outwater | ............... | G07B 15/02 705/13 |
| 2015/0254570 | A1 | * | 9/2015 | Florence | ............... | G06N 7/005 706/52 |
| 2015/0339911 | A1 | * | 11/2015 | Coyne | ............... | G08B 23/00 340/517 |
| 2017/0243488 | A1 | * | 8/2017 | Meijer | ............... | G08G 1/144 |

* cited by examiner

*Primary Examiner* — Paul D Lee
(74) *Attorney, Agent, or Firm* — Norton Rose Fulbright US LLP; Gerard Messina

(57) ABSTRACT

A method for controlling a parking lot sensor, which includes a sensor for scanning a predetermined measuring area, includes steps of determining an expected fluctuation of vehicles in the measuring area, of determining a scanning frequency on the basis of the expected fluctuation and of controlling, as a function of the scanning frequency, the sensor respectively for carrying out a scan.

11 Claims, 3 Drawing Sheets

CONTROLLING A PARKING LOT SENSOR

CROSS REFERENCE

The present application claims the benefit under 35 U.S.C. § 119 of German Patent Application Ser. No. DE 102015211054.0 filed on Jun. 16, 2015, which is expressly incorporated herein by reference in its entirety.

FIELD

The present invention relates to a parking lot sensor, in particular the present invention relates to controlling the parking lot sensor for scanning a measuring area in order to determine the presence of a vehicle.

BACKGROUND INFORMATION

A parking lot includes multiple parking spaces, in which respectively one vehicle may be parked. A management system for the parking lot includes a parking lot sensor at every one of the parking spaces, a central processing device and a communication network between the parking lot sensors and the processing device. Each parking lot sensor determines whether or not a vehicle is located in the parking space assigned to it. The parking lot sensor transmits the result of this determination to the management system, which thereupon is able for example to make arrangements so that free parking spaces become occupied or to charge for occupied parking spaces.

Each parking lot sensor includes a sensor for scanning the parking space. The sensor may implement one of several conventional measuring principles. The parking lot sensor may be operated by a battery that has a limited capacity. Additionally or alternatively, the parking lot sensor may also be designed to supply itself with energy, for example by energy harvesting. An average power consumption of the parking lot sensor may generally depend on how frequently determinations are made by the sensor. To save energy, it is therefore advantageous to perform scans as seldom as possible. On the other hand, this also increases a response time of the parking lot sensor such that it is possible that the parking lot sensor misses a change of a vehicle parked in the parking space. In practice, an attempt is therefore made to define a scanning frequency of the parking lot sensor in such a way that an acceptable compromise is achieved between a low power consumption and a short response time.

The present invention is based on the objective of indicating a technology for controlling a parking lot sensor that allows for the formation of an improved compromise.

SUMMARY

A method for controlling a parking lot sensor, which includes a sensor for scanning a predetermined measuring area, includes steps of determining an expected fluctuation of vehicles in the measuring area, of determining a scanning frequency on the basis of the expected fluctuation and of controlling, as a function of the scanning frequency, the sensor respectively for carrying out a scan.

The frequency with which the sensor scans as to whether or not a vehicle is located in the measuring area is preferably high when a high fluctuation of vehicles is to be expected and low when the fluctuation is to be assumed to be low. The fluctuation indicates how frequently an average change occurs in the determination value of the presence of a vehicle in the measuring area.

If a low fluctuation is expected, then the scanning frequency may be low such that the sensor is only seldom in operation and a power consumption of the parking lot sensor is therefore low. If by contrast a high fluctuation is expected, then the response time of the parking lot sensor may be shortened such that it is possible to detect an entry or exit of a vehicle into or out of the measuring area with a shortened response time. In this manner, the seemingly contradictory requirements of a low energy consumption and a short response time may be combined.

Preferably, the frequency of change of the determination result in a past time period is stored, the scanning frequency being determined on the basis of a frequency of change that was valid prior to a predetermined time span. The predetermined time span is for this purpose usually shorter than the past time period.

In this manner, it is possible to use historical data of the frequency of change of the determination result in order to find an expedient scanning frequency for a current time period. Usually, a time characteristic of the frequencies of change in the past time period follows a recurring pattern. By analyzing this pattern, it is possible to determine a periodicity and to equate the time span with the period duration. The frequency of change points to the fluctuation of vehicles in the measuring area.

For example, by analyzing frequencies of change within a past time period of approximately one week, it is possible to determine that the frequency of change has a period of one day. The predetermined time span may thus be set to a day such that the scanning frequency is always determined on the basis of the frequency of change of the determination result of a day prior.

In one preferred specific embodiment, the frequency of change is in each case determined with reference to time intervals of equal length within the past time period. This quantization facilitates the processing and the storing of frequencies of change. Furthermore, a smoothing or filtering of the observed frequencies of change may thereby be achieved. Regarding the example mentioned above, a time interval may be approximately one hour for example.

It is furthermore preferred if the past time period has a predetermined length. This ensures that the memory required for storing the frequency of change does not exceed a predetermined size. Practically, this means that a parking lot sensor only needs to include a memory of a limited size.

It is furthermore preferred if a configuration is specified, which respectively assigns a class to mutually adjoining ranges of frequencies of change and assigns a scanning frequency to the class. The classification makes it possible for the scanning frequency to result from the frequency of change indirectly such that a certain interference resistance maybe achieved. With reference to the above example, a class of low fluctuation at up to two changes per interval and another class of high frequency of change at more than two changes per interval may be specified for instance. At a low frequency of change, the scanning interval may be five minutes for example, while at a high frequency of change, the scanning interval maybe 30 seconds for example. In this context, the scanning interval is the inverse of the scanning frequency.

In another variant, a configuration is specified that respectively assigns a class to mutually adjoining ranges of frequencies of change, a scanning frequency being determined, however, on the basis of a maximum response time and a class. This determination may be performed in particular on the part of the parking lot sensor. This determination makes it possible to maintain the maximum response time while at the same time saving the maximum amount of energy.

A parking lot sensor includes a sensor for scanning a predetermined measuring area, a control unit, which is designed to control the sensor for performing a scan and to determine, on the basis of scanning result, the presence of a vehicle in the measuring area, as well as a communication device for transmitting the result of the determination. In this context, the control unit is designed to control a scanning frequency as a function of an expected fluctuation of vehicles in the measuring area. This makes it possible to implement the parking lot sensor both with sufficiently quick response and in an improved energy-saving manner. This makes it possible to lower servicing and maintenance costs for the parking lot sensor. By saving energy, an environmental load may be reduced. Moreover, this may provide a functional reserve in the event of a poor energy supply situation.

The parking lot sensor preferably has a limited energy reserve, it being possible for the sensor to be switched to an energy-saving state between scans. In particular, the sensor may be switched off between scans. The sensor may have a significant share in the current consumption of the parking lot sensor such that much energy may be saved by switching it off periodically.

This is true especially if the sensor implements an active measuring principle, in which a signal is actively sent out and an object's influence on the signal in the measuring area is evaluated. The emitted signal may include for example a light or radar signal, the reflection or echo of which is detected. Other examples for active measuring principles include an electromagnetic determination, a magnetic determination or a determination by ultrasound. It is also possible for multiple sensors to be provided that preferably follow different measurement principles.

A management system for a parking lot having multiple parking spaces for vehicles includes several of the described parking lot sensors, which are each assigned to one parking space, as well as a central management unit having a receiver device for receiving determination results of a parking lot sensor.

The management unit is preferably designed to determine fluctuations of vehicles in assigned measuring areas of the parking lot sensors, to determine, on the basis of the fluctuations, scanning frequencies for the individual parking lot sensors, and to transmit the scanning frequencies to the parking lot sensors. This makes it possible to associate fluctuations in arbitrary sections of the parking lot or in the entire parking lot to the determination of the scanning frequencies at the individual parking spaces.

BRIEF DESCRIPTION OF THE DRAWINGS

The present invention is described in greater detail below with reference to the figures.

DETAILED DESCRIPTION OF EXAMPLE EMBODIMENTS

Figure 1:
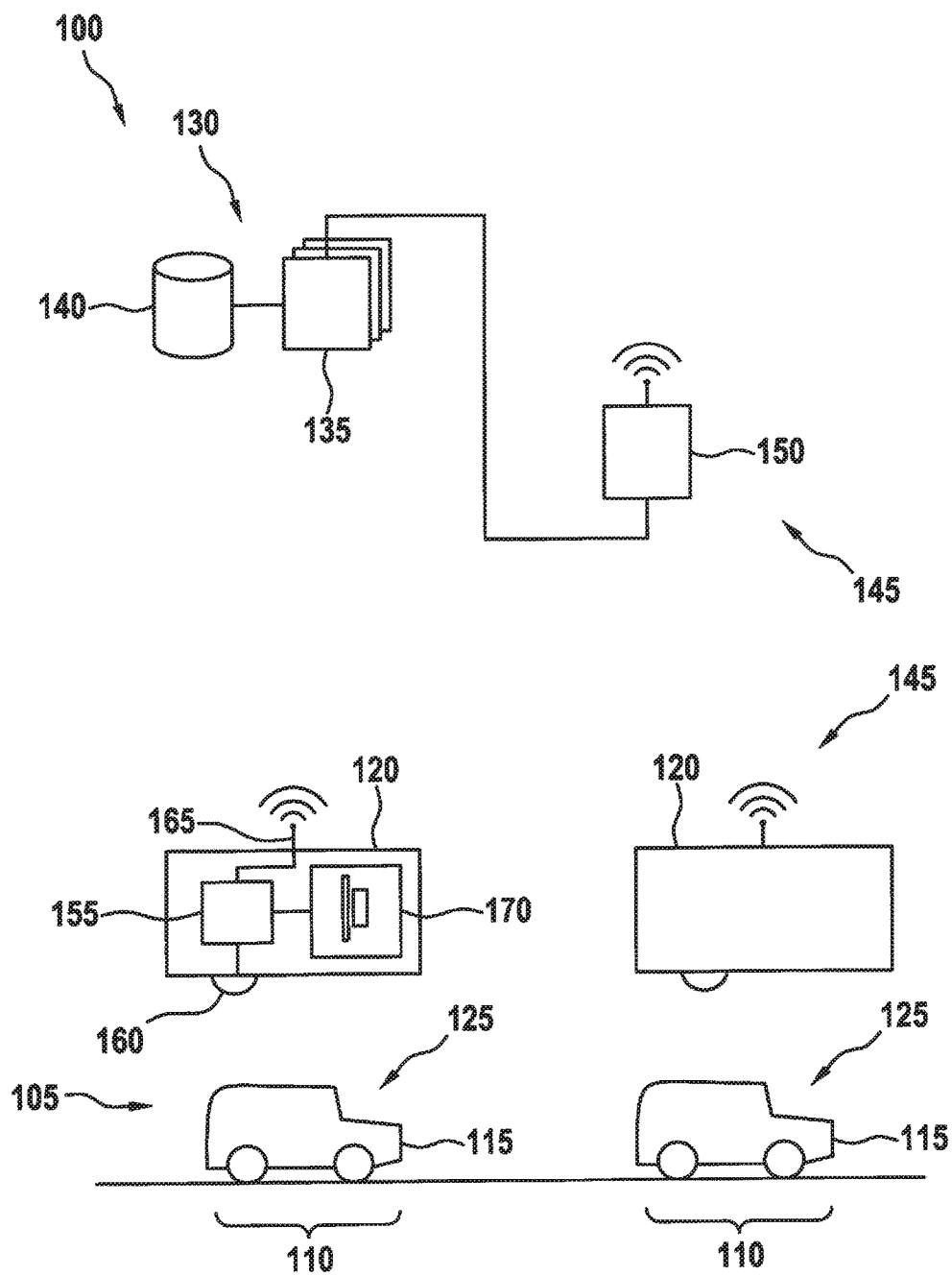
FIG. 1 shows an example system for managing a parking lot having multiple parking spaces.

FIG. 1 shows a management system 100 for a parking lot 105 having multiple parking spaces 110, which are designed respectively for a vehicle 115, preferably a motor vehicle. At one or multiple parking spaces 110, respectively one parking lot sensor 120 having a measuring area 125 is provided, which covers at least a portion of the space in which vehicle 115 may be parked in parking space 110.

In the illustrated specific embodiment, parking lot sensor 120 is disposed above parking space 110 or motor vehicle 115, while in other specific embodiments parking lot sensor 120 may also be disposed at another location, for example below vehicle 115 of at half height.

In addition to parking lot sensors 120, management system 100 also includes a central management unit 130, which preferably includes a processing device 135 and optionally a memory 140. Multiple management units 130 or processing devices 135 are also possible. A network 145 is provided for communication between central management unit 130 and parking lot sensors 120, which in the present example is partly wireless and partly wired. One or multiple optional gateways 150 are provided for the conversion between a wired and a wireless part of network 145.

A vehicle sensor 120 includes a control unit 155, a sensor 160, and a communication device 165. Usually, an energy supply 170 is also provided, which in one specific embodiment is able to supply only limited energy. For example, energy supply 170 may be a battery, a local device for supplying electrical energy such as a solar cell for example, or a combination of these.

Sensor 160 may implement any physical measuring principle. For this purpose, sensor 160 may be passive, in that it evaluates a physical signal present in measuring area 125, or active, in that it provides a suitable physical signal in measuring area 125 and evaluates the influence of vehicle 115 on it. Examples of passive sensors include magnetometers and light sensors, while active sensors may include radar sensors, lidar sensors or ultrasonic sensors for example.

The present invention provides for a frequency, with which a vehicle sensor 120 by way of sensor 160 performs a determination about the presence of a vehicle 115 in the parking space 110 to be a function of an expected fluctuation of vehicles 115 in the measuring area 125. The determination of the expected fluctuation and the derivation of the scanning frequency from the expected fluctuation alternatively may be performed by control unit 155 or by the processing device 135 of the central management unit 130. It is also possible to distribute partial tasks to the two components 155, 135.

Figure 2:
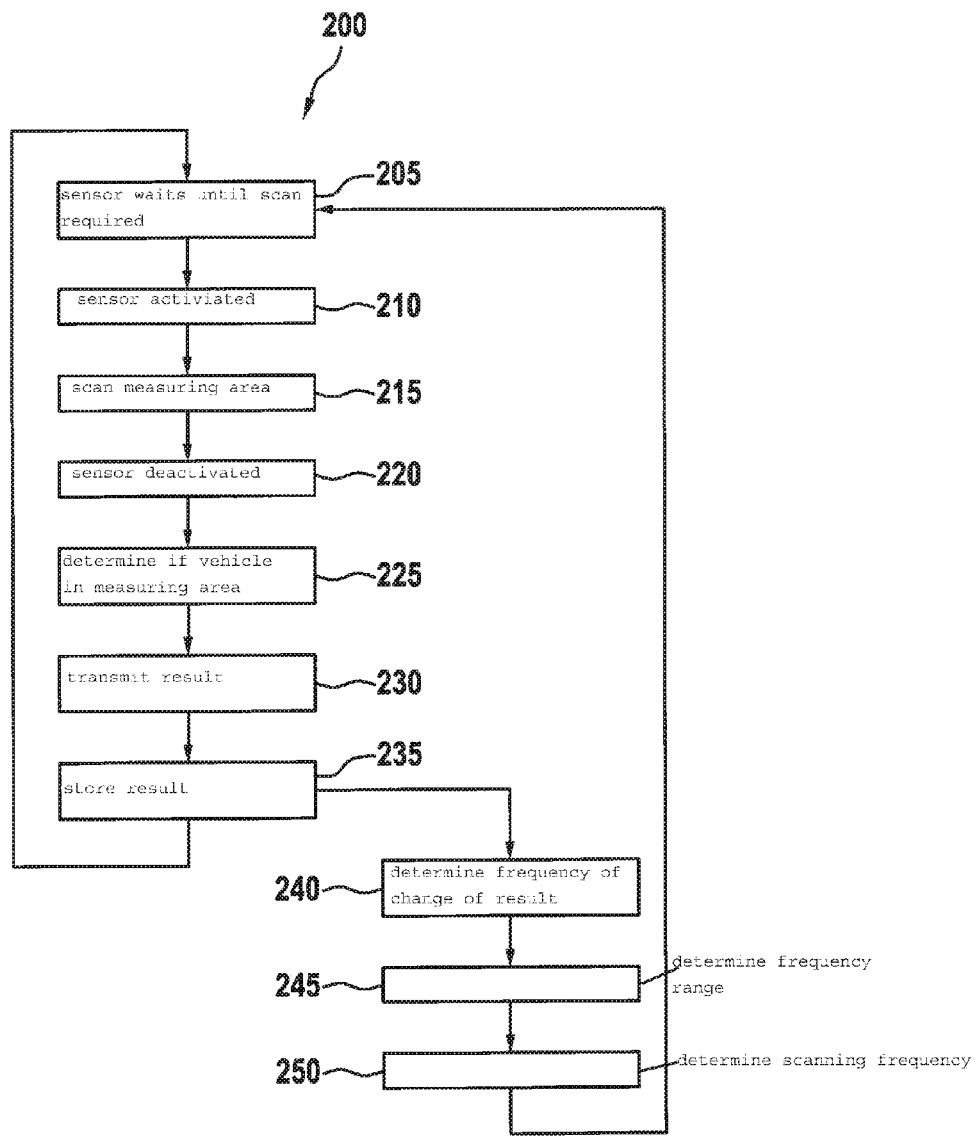
FIG. 2 shows a flow chart of an example method for controlling a parking lot sensor of the system of FIG. 1.

FIG. 2 shows a flowchart of a method 200 for controlling the parking lot sensor 120 of system 100 from FIG. 1. In a first step 205, vehicle sensor 120 waits as a function of a predetermined scanning frequency until a scan is required. If this is the case, then sensor 160 is activated in a step 210, and the measuring area 125 is scanned in a step 215, and sensor 160 is deactivated in a step 220. The activation may include switching sensor 160 on and the deactivation may include switching sensor 160 off. Depending on the construction or measuring principle of sensor 160, another procedure may be required, it being possible in particular for steps 210 and 220 to be omitted in the case of a passive sensor.

In a subsequent step 225, a determination is made on the basis of the scanning result as to whether or not a vehicle 115 is located in measuring area 125. This determination is preferably made on the part of sensor 160 or on the part of control unit 155. A step 230, the result of the determination is transmitted via communication device 165 to central management unit 130. Under certain circumstances, for example if an occupancy state of parking space 110 has not changed, the transmission of the result of the determination may also be omitted. In a step 235, the result of the determination is also stored. For this purpose, a circular buffer is preferably used in order to store determination results of a predetermined past time period in a cyclical manner. Alternatively, the storage may also be provided within vehicle sensor 120 or within central management unit 130. Method 200 may then return to step 205 and run through anew. In parallel, the scanning frequency is determined on the basis of the determination result, which is used in step 205. For this purpose, a frequency of change of the determination result in a predetermined time interval may be determined in a step 240. On the basis of this frequency of change, a frequency range is optionally determined in a step 245, which may be assigned a predetermined scanning frequency. Alternatively, the scanning frequency may also be determined in a step 250 on the basis of the frequency of change and for example a specified maximum response time. The scanning frequency is then provided to step 205.

The two sub-methods 205 through 235 and 240 through 250 may also be executed concurrently or in parallel.

Figure 3:
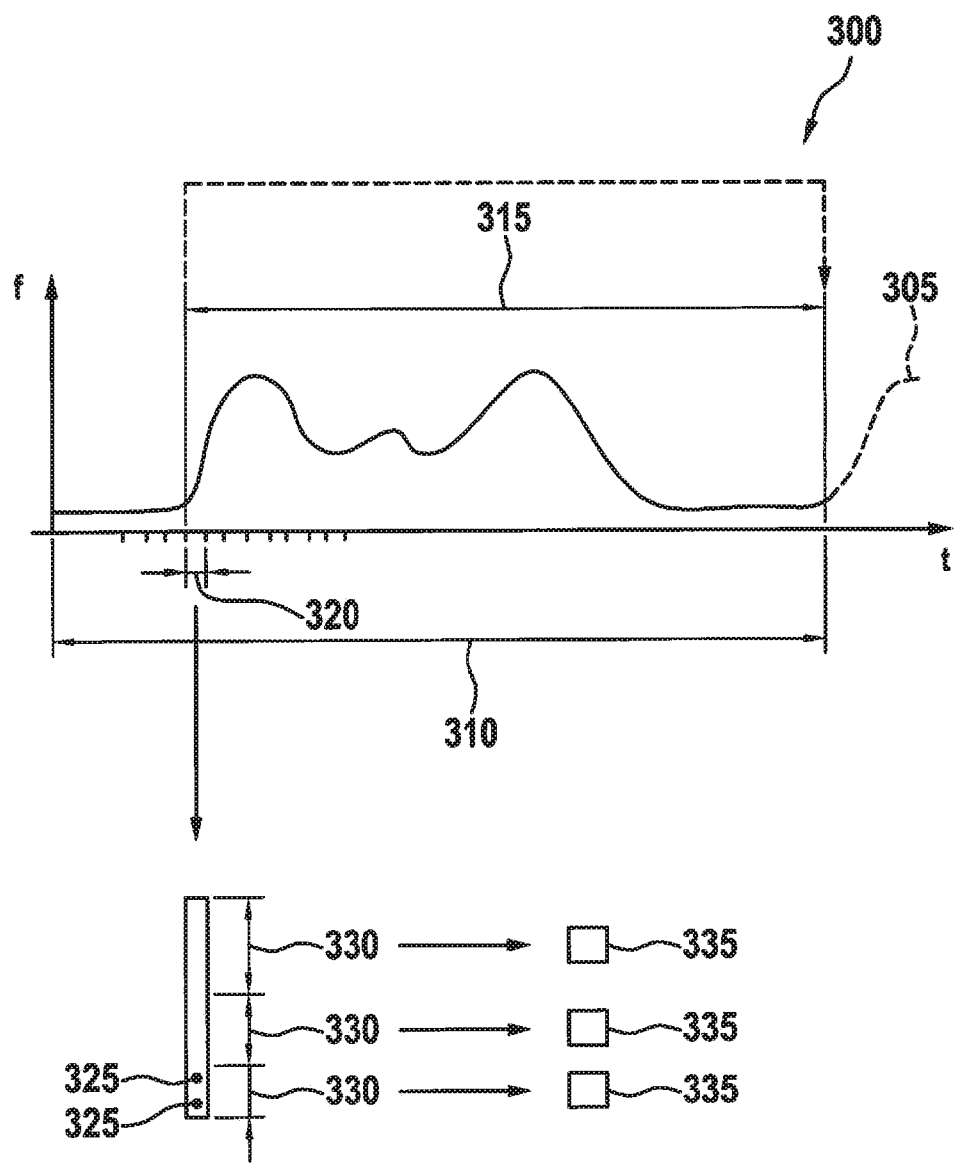
FIG. 3 shows a graphical illustration of the method of FIG. 2.

FIG. 3 shows a graphical representation 300 of the method 200 from FIG. 2. The upper area shows a time characteristic 305 of the frequency of change of the determination result of a parking lot sensor 120. The present invention provides for the selection of a scanning frequency of the vehicle sensor 120 as a function of an expected fluctuation of vehicles 115 in parking space 110. The fluctuation corresponds to the frequency of change of the determination result of vehicle sensor 120. The scanning frequency of vehicle sensor 120 should therefore follow at least qualitatively the characteristic 305 shown. A fluctuation may naturally be determined only for a past time period, and the present invention provides for determining an expected current fluctuation on the basis of historical data.

For this purpose, it is possible to store frequencies of change of the result of the determination of the presence of a vehicle 115 in the measuring area 125 of vehicle sensor 120 in a past time period 310. The use of a circular buffer is advantageous for this purpose, in which current values respectively overwrite the oldest stored values. The past time period 310 preferably amounts to several days, for example one week or ten days. By analyzing the frequencies of change within the past time period 310, it is possible to determine whether the characteristic 305 of the frequency of change is subject to a cycle. It may be expected, for example, that such a cycle corresponds to a day. The exemplary representation of FIG. 3 graphically indicates a high frequency of change in a morning, a medium frequency of change in a midday period, a high frequency of change in an evening and a low frequency of change during a nighttime. Only one cycle is shown, however, even if the past time period 310 may include several such cycles.

Once the cycle time or period of characteristic 305 is determined, this time span 315 may be used for predicting the frequency of change. A current frequency of change of the determination result—and thus an expected fluctuation—of vehicles 115 in measuring area 125 of vehicle sensor 120 may be determined on the basis of the particular frequency of change that occurred earlier by time span 315 than the current point in time.

For handling frequencies of change 325, it is preferred to divide the past time period 310 into successive intervals 320 of equal length in time. As indicated in the lower area of FIG. 3, it is possible to count in each interval 320 what frequency of change 325 of the determination result of vehicle sensor 120 was determined. Two changes of the determination result in the interval 320 in question are shown in exemplary fashion. The frequency of change 325 may be determined directly on the basis of the changes, for example by multiplication by a constant factor.

The required scanning frequency of vehicle sensor 120 may also be determined on the basis of a maximum reaction time, which is given by the time interval between two successive scans.

In one preferred specific embodiment, the number of the changes of the determination result in an interval 320 is divided into one of multiple classes 330, a predetermined scanning frequency 335 being assigned to each class 330. A low scanning frequency 335 is assigned to a low number of changes 325, and a high scanning frequency 335 is assigned to a high number of changes 325. The scanning frequencies determined in this manner may bear numerical or verbal designations.

Individual scans are not shown in representation 300, it usually being the case, however, that multiple scans are performed within each interval 320.

What is claimed is:

1. A method for controlling a parking lot sensor, which includes a sensor for scanning a predetermined measuring area, the method comprising:
   determining, via a control unit of a vehicle sensor or a processing device of a central management unit outside the vehicle, an expected fluctuation of vehicles in the measuring area, wherein the expected fluctuation indicates how frequently an average change occurs in a determination value of a presence of a vehicle in the measuring area;
   determining, via the control unit of the vehicle sensor or the processing device of the central management unit outside the vehicle, a scanning frequency based on the expected fluctuation; and
   controlling, via the control unit, as a function of the scanning frequency, the sensor respectively for performing a scan, in an energy saving manner and a reduced response time, of the parking lot;
   wherein a frequency of the average change of the determination value in a past time period is stored, and the scanning frequency is determined based on a frequency of the average change occurring prior to a predetermined time span.

2. The method as recited in claim 1, wherein the frequency of change is in each case determined with respect to time intervals of equal length within the past time period.

3. The method as recited in claim 2, wherein the past time period has a predetermined length.

4. The method as recited in claim 3, wherein a configuration is specified, which respectively assigns a class to mutually adjoining ranges of frequencies of change and assigns a scanning frequency to the class.

5. The method as recited in claim 3, wherein a configuration is specified, which respectively assigns a class to mutually adjoining ranges of frequencies of change, a scanning frequency being determined on the basis of a maximum response time and a class.

6. A non-transitory computer-readable storage medium storing a program, which is executable by a processor, comprising:
   a program code arrangement having program code for controlling a parking lot sensor, which includes a sensor for scanning a predetermined measuring area, the program code, when executed by a processing device, by causing the processor to perform the following:

determining, via a control unit of a vehicle sensor or a processing device of a central management unit outside the vehicle, an expected fluctuation of vehicles in the measuring area, wherein the expected fluctuation indicates how frequently an average change occurs in a determination value of a presence of a vehicle in the measuring area;

determining, via the control unit of the vehicle sensor or the processing device of the central management unit outside the vehicle, a scanning frequency based on the expected fluctuation; and controlling, via the control unit, as a function of the scanning frequency, the sensor respectively for performing a scan, in a energy saving manner and a reduced response time, of the parking lot;

wherein a frequency of the average change of the determination value in a past time period is stored, and the scanning frequency is determined based on a frequency of the average change occurring prior to a predetermined time span.

7. A parking lot sensor, comprising:

a sensor for scanning a predetermined measuring area;

a control unit to control the sensor for performing a scan, in an energy saving manner and a reduced response time, and to determine, based on a scanning result, the presence of a vehicle in the measuring area; and a communication device for transmitting the determination result to a central management system;

wherein the control unit is configured to control a scanning frequency as a function of an expected fluctuation of vehicles in the measuring area, wherein the expected fluctuation indicates how frequently an average change occurs in a determination value of a presence of a vehicle in the measuring area;

wherein a frequency of the average change of the determination value in a past time period is stored, and the scanning frequency is determined, via the control unit of the vehicle sensor or a processing device of a central management unit outside the vehicle, based on a frequency of the average change occurring prior to a predetermined time span.

8. The parking lot sensor as recited in claim 7, wherein the parking lot sensor has a limited energy reserve and the sensor is switched to an energy-saving state between scans.

9. The parking lot sensor as recited in claim 8, wherein the sensor implements an active measuring principle, in which a signal is actively sent out and an object's influence on the signal in the measuring area is evaluated.

10. A management system for a parking lot having multiple parking spaces for vehicles, comprising:

multiple parking lot sensors, each assigned to a parking space, each of the parking lot sensors including a sensor for scanning a predetermined measuring area, a control unit configured to control the sensor for performing a scan, in an energy saving manner and a reduced response time, and to determine, based on a scanning result, the presence of a vehicle in the measuring area, and a communication device for transmitting the determination result to a central management unit, wherein the control unit is configured to control a scanning frequency as a function of an expected fluctuation of vehicles in the measuring area, wherein the expected fluctuation indicates how frequently an average change occurs in a determination value of a presence of a vehicle in the measuring area, wherein the expected fluctuation is determined by the control unit of a vehicle sensor having the sensor or a processing device of a central management unit outside the vehicle,; and the central management unit having a receiver device for receiving determination results of a parking lot sensor;

wherein a frequency of the average change of the determination value in a past time period is stored, and the scanning frequency is determined based on a frequency of the average change occurring prior to a predetermined time span.

11. The management system as recited in claim 10, wherein the management unit is configured to determine fluctuations of vehicles in assigned measuring areas of the parking lot sensors, to determine, based on the fluctuations, a scanning frequency for each of the parking lot sensors, and to transmit the scanning frequencies to the parking lot sensors.

* * * * *